United States Patent [19]

Klopsch

[11] 4,189,742

[45] Feb. 19, 1980

[54] APPARATUS FOR INDICATING OVERCORRECTIONS, IN ELECTRICAL COLOR CORRECTION APPARATUS

[75] Inventor: Siegfried Klopsch, Probsteierhagen, Fed. Rep. of Germany

[73] Assignee: Dr. Ing. Rudolf Hell GmbH, Fed. Rep. of Germany

[21] Appl. No.: 894,566

[22] Filed: Apr. 7, 1978

[30] Foreign Application Priority Data

Apr. 30, 1977 [DE] Fed. Rep. of Germany ....... 2719387

[51] Int. Cl.² .............................................. G03F 3/08
[52] U.S. Cl. ........................................................ 358/80
[58] Field of Search .................................. 358/76, 80

[56] References Cited

U.S. PATENT DOCUMENTS

| | | | |
|---|---|---|---|
| 3,441,663 | 4/1969 | Dreyfoos, Jr. et al. | 358/76 |
| 3,848,856 | 11/1974 | Reeber et al. | 358/76 |
| 3,972,066 | 7/1976 | Seki et al. | 358/76 |
| 4,037,249 | 7/1977 | Pugsley | 358/76 |
| 4,096,519 | 6/1978 | Hoffrichter et al. | 358/80 |

Primary Examiner—Richard Murray
Attorney, Agent, or Firm—Hill, Van Santen, Steadman, Chiara & Simpson

[57] ABSTRACT

In a device for producing corrected color chromatic components for multicoloring printing in which an original is scanned and displayed on a color monitor in which different color components are supplied to comparators for each color channel and in the comparators the color signals are respectively compared with upper and lower thresholds such that the colors which exceed or fall below the threshold values are indicated so that color corrections may be made.

7 Claims, 2 Drawing Figures

APPARATUS FOR INDICATING OVERCORRECTIONS, IN ELECTRICAL COLOR CORRECTION APPARATUS

BACKGROUND OF THE INVENTION

1. Field of the Invention

The present invention relates to means for preventing color signals from exceeding upper and lower threshold values.

2. Description of the Prior Art

U.S. Pat. No. 3,848,856 describes an apparatus in which a raster scan scans a color image for example a color slide or finished color extraction and supplies a set of color component signals which are subjected to an electronic color correction and then supplied to a video display receiver for observation and control. The color component signals represent the color dosage values for the individual print colors magenta, cyan, yellow and black and are to be corrected with an apparatus having a level indicator under viewing control. So that color images will also be formed on the video receiver, the impression is produced by an image printed with the corrected color component signals with the aid of the corresponding color extractions and a print reproducing computer is provided between the correction stage and the video receiver which takes into consideration the fixed parameters of the respective printing method for display. In such apparatus, the color correction is accomplished in selected local areas and made visible. The respective color component signals are measured and supplied to a person skilled in the art in order to allow him to correspondingly rework by hand the selected local areas of the color extraction slides or plates. These corrections are carried out either by etching or by photographing exposure with corresponding masks.

Such apparatus has the advantage that the corrections can be visibly observed, however, it is a disadvantage that the actual correction of the color extractions must be accomplished by hand which is time consuming and does not assure that the corrections in the color extraction precisely correspond with the corrections appearing on the video receiver as this depends exclusively upon the skill of the operator making the corrections.

Equipment is also known which allows the production of corrected color extractions automatically. However, the adjustment of the correction must be undertaken by hand and by densitometer measuring of various image points of the original and subsequently evaluation by a person skilled in the art who sets the color correction regulator. Such equipment has the disadvantage that the correction also depends upon the skill of the operating personnel and can only be controlled in the finished color extraction or in the printed product. To provide such equipment with video display equipment, display on a video display means can only be realized with very high storage expenses as the data which are supplied by a flat belt scanner or a spiral drum scanner or a drum scanner with intermittent feed are not suited for producing a still picture because such pictures occur only once and a drum or belt recording apparatus is controlled on a line.

SUMMARY OF THE INVENTION

My copending application U.S. Ser. No. 770,192, filed Feb. 18, 1977 entitled "Apparatus for Producing Corrected Color Chromatic Components", discloses apparatus which allows adjustment of color correction with a level indicator and automatic production of individual color extractions. In that apparatus the color correction can be readily adjusted, however, with the large number of correction regulators in the color computer, it is possible that overcorrections or overcompensations can occur in various image areas. For example, when the image signals exceed the signal range set by image black and image white. Such defective setting cannot always immediately be recognized on the color viewing screen of the color correction monitor and in fact the monitor image must be carefully evaluated for a substantial length of time during which measurements are made.

The present invention has the primary object of improving color correction by means of a display which immediately indicates when various signal components exceed a first threshold or fall below a second threshold value.

Thus, the invention allows very simple color corrections with relatively inexperienced operators who need merely observe when the overthreshold light or underthreshold light for particular color component is illuminated.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
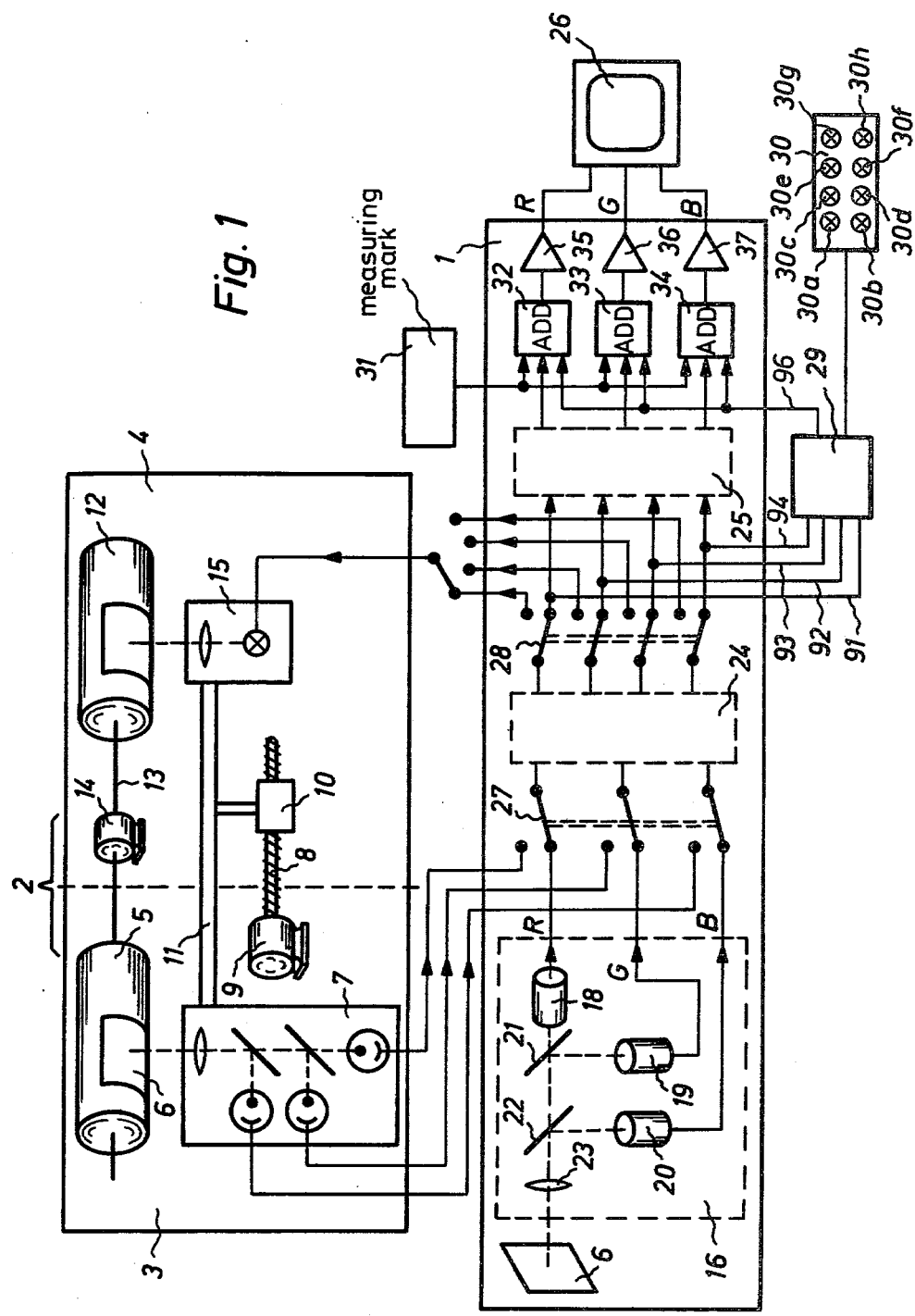
FIG. 1 is a circuit diagram illustrating the invention with the overcorrection display.

FIG. 1 illustrates a color correction means 1 connected to a machine for producing the individual color extractions 2. Machine 2 includes a scanning unit 3 and a recording unit 4. The scanning unit consists of a scanning drum 5 upon which the original 6 is mounted which is scanned line by line by scanning head 7 which is axially moved along side of the drum 5 by means of suitable bars, a nut 10 and a threaded mandrel 8 which is driven by a motor 9. The motor through means of the spindle nut 10 and bar 11 moves the scanning head 7 back and forth line by line across the original 6 in a well known manner.

The recording unit 4 also consists of a recording drum 12 mounted on a common shaft 13 with the scanning drum 5 and both the drums 5 and 12 are driven by a motor 14. A recording head 15 is mounted to move with the scanning head 7 and is supported on the bar 11 so that it records line by line as the motor 9 causes the scanning and recording heads 7 and 15 to move back and forth relative to the drums 5 and 12.

Before the production of color extraction starts, the color correction is accomplished in the color correction means 1. A previously known television camera unit 16 is provided which scans the original 6. For this purpose, the original 6 is mounted adjacent to the television camera unit 16 as shown in FIG. 1 before being mounted on the drum 5. With the use of the camera tubes 18, 19 and 20, the image of the original is scanned line by line using reflector divider mirrors 21 and 22 and an optical system 23. The optical objective 23 may be a zoom-objective lense. The electrical color measuring value signals R, G, and B (red, green and blue) obtained by the camera tubes are supplied to a color computer 24 from which they are supplied to a color transposer or translator 25 which energizes a monitor 26.

FIG. 1 and the description associated therewith does not illustrate the pulse control for the camera and monitor as such controls are well known to those skilled in the art and is not necessary for an understanding of the present invention. In a practical embodiment for example, a commercial studio camera and a commercial color monitor can be used.

Details of pulse control and raster production, for example, are discussed in the text book Television Technique, vol. 2 by H. Schoenfelder, published by Justus von Liebig, Darmstadt, Chapter 10, Impulse Technique, pages 10/1 through 10/5 and Chapter 11, Deflection Technique, pages 11/1 through 11/26. Such pulse control and raster production are also accomplished in standard commercial television sets and are well known to those skilled in the art.

A circuit 29 for evaluating overcorrection, is connected to the output of the color computer 24 in other words to the four output color components of the color computer 24 by the switch 28 and the circuit 29 individually monitors the four color signals and supplies output to the adders 32, 33 and 34 which control the monitor 26 through the amplifiers 35, 36 and 37. So as to evaluate overcorrection, a display field 30 is additionally connected to the circuit 29 and the display field 30 receive outputs from the circuit 29. The display field 30 has a plurality of indicator lights 30a through 30h with a pair of lights associated with each of the four color component values supplied to the input of the circuit 29 to respectively indicate above threshold and below threshold which indicates overcorrection. A generator 31 is provided and supplies to the adding circuits 32, 33 and 34 as well as the circuit 29 measuring mark signals so as to provide start-up and measure and the overall corrected location point on the monitoring screen. The function in operating characteristics of this measuring mark generator is illustrated in detail in my copending application Ser. No. 770,192 filed Feb. 18, 1977 entitled "Apparatus for Producing Corrected Color Chromatic Components" and in particular in FIGS. 4 through 6 of which description and Figures is hereby incorporated by a reference.

The connecting together of the signals from the output of the transposer 25 and the circuit 29 for evaluating overcorrection and the measuring mark generator is accomplished with decoupling impedances and is only schematically illustrated in FIG. 1. Adders 32, 33 and 34 are individually provided and receive the outputs of the color transposer 25 the circuit for evaluating overcorrection 29 and the generator 31 and supply outputs to amplifiers 35, 36 and 37 which provide the R, G and B signals at their outputs for driving the monitor 26.

Figure 2:
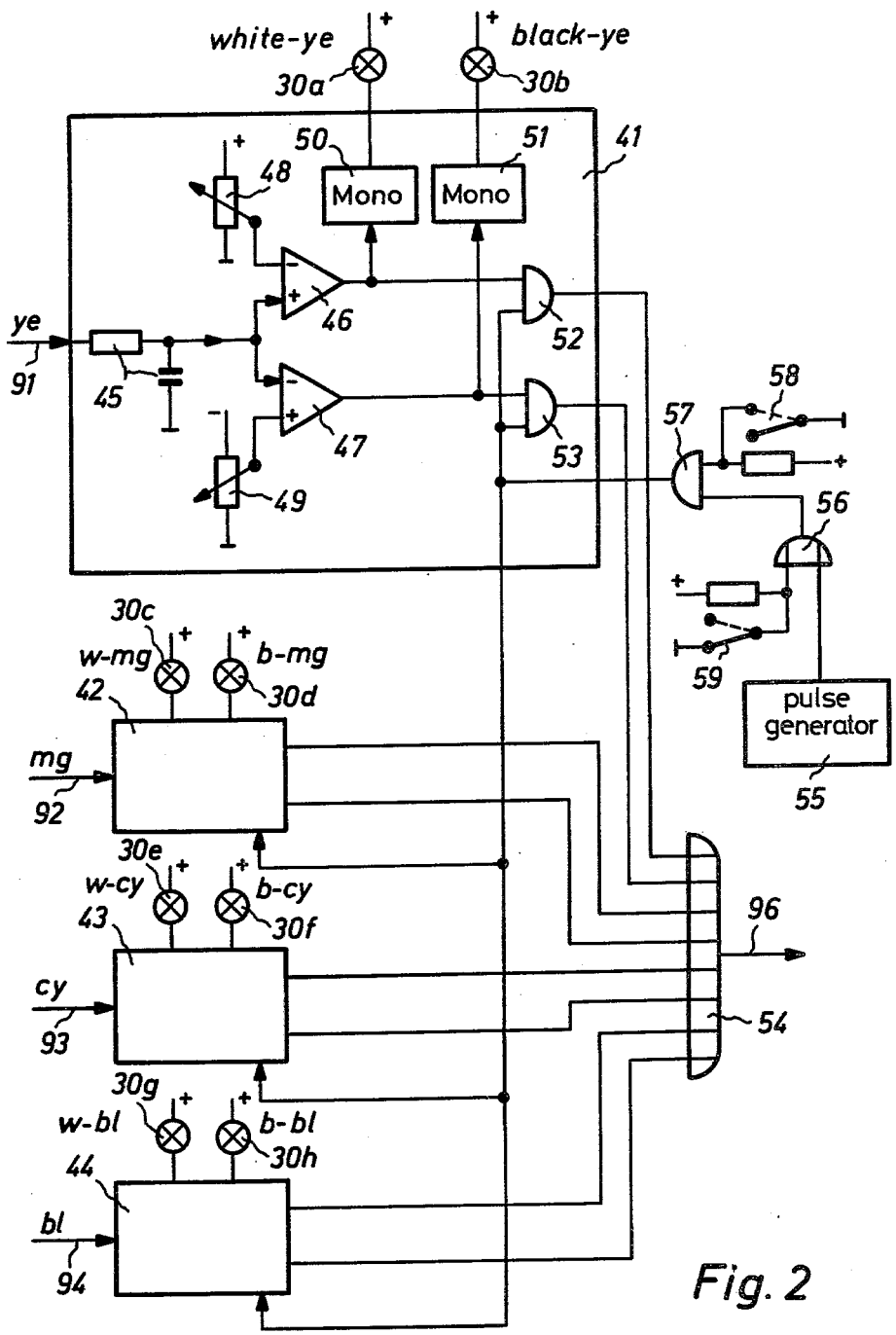
FIG. 2 is a circuit diagram of the circuit for evaluating overcorrection.

FIG. 2 is a detail description of circuit 29 for evaluating overcorrection. The circuit 29 consists of four comparator stages 41, 42, 43 and 44. The various color component signals yellow, magenta, cyan and black are respectively supplied from switch 28 in the color computer 24 to the four comparator stages 41, 42, 43 and 44 as shown by input leads 91 through 94 which are also illustrated in FIG. 1. The indicator lights 30a and 30b of the display field 30 are illustrated connected to the yellow comparator stage 41 and will be illuminated in the event of the signal being above or below the threshold respectively.

Since the color comparator stages 41 through 44 are constructed in the same manner, only one of the comparators stages 41 will be described in detail. Within the stage 41 is mounted a module LM 319 Dual comparator of National Semiconductor which comprises a pair of comparators which simplify the circuit design technique.

The yellow monitoring channel 41 supplies the input yellow signal on lead 91 through a resistor 45 which has its other side connected to ground through a capacitor C. The resistor and capacitor are designated by 45 and these elements eliminate interference impulses and prevent very short image signals from switching the comparators 46 and 47. The junction point comprising the yellow input signal is supplied to the plus and minus inputs respectively of comparators 46 and 47. The upper switching threshold circuit comprising the comparator 46 receives on its negative input terminal an input from a potentiometer 48 which has its one side connected to a suitable positive voltage source and its other side connected to ground. The lower threshold comparator 47 receives on its positive input an input from the potentiometer 49 which has one side grounded and its other side connected to a negative potential source.

The output of comparator 46 is connected to a mono-stable flip-flop 50 and the output of comparator 47 is connected to mono-stable flip-flop 51. Indicator light 30a is connected and controlled by circuit 50 and indicator light 30b is connected and controlled by circuit 51. The lamp 30a is indicated as the white-yellow lamp and indicates a condition when the signal is above the threshold value and the indicator lamp 30b is designated the black-yellow lamp and indicates when the yellow signal is below the threshold value. The circuits 50 and 51 may comprise the dual mono-flop type SN74129 available from the Texas Instrument Company. If the yellow signal has a level which is too high in other words if it is overcorrected toward white the comparator 46 turns on the circuit 50 for the duration of the overcorrection and the light 30a will be illuminated because the mono-stable flip-flop 50 will be simultaneously actuated to turn on the light 30a. The transient time of flip-flop 50 is determined such that it is longer than the image repeat time. Thus, flip-flop 50 is always newly activated before resetting which means that the lamp 30a will remain lighted. Not until the comparator threshold is no longer exceeded, in other words, when the overcorrection has been removed will the flip-flop 50 switch back and reset and will the lamp 30a be turned off.

The output of the comparator 46 is also supplied to an AND gate 52 and the output of comparator 47 is connected to AND gate 53. The AND gate 52 will be opened and block in the interval for example of approximately one second so that the output signal is interrupted at this frequency. Therefore the switching signal which is produced by a switching signal generator 55 and supplied to the AND gates 52 and 53 through a OR gate 56 and AND gate 57. The generator 55 may be type module K1100A Crystal Oscillator from Motorola which is available at various frequencies. The AND gate 57 and the AND gate 52 can be continuously blocked with a signal supplied through switch 58 such that when the switch 58 is closed no overcorrection display appears at the output.

The blinking of the correction signal can be prevented by opening a switch 59 which also supplies an input to the OR gate 56.

The outputs of the AND gates 52 and 53 are supplied to the OR gate 54 and supplied on lead 96 to the color monitor 26 through the adders 32, 33 and 34 and the amplifiers 35, 36 and 37.

The other color signals magenta, cyan and black are also processed in the same manner in the comparator stages 42, 43 and 44 and these stages respectively drive indicator lights 30c through 30h in the same manner in which circuit 41 drives indicator lamps 30a and 30b. Thus, the observer is immediately notified by illumination of these lights whether any of the signals are above or below threshold values.

It is ssen that the present invention is a simple but effective circuit and the display of overcorrection on the monitor is particularly obvious due to the lighting up of the lamps 30a through 30h and the lighting up of such lamps occurs on and off at the rhythm of approximately one second. With the aid of the two display lamps respectively provided for each color channel it can be determined for each channel whether it is being overcorrected in white or in black. From this indication, it can be readily determined which regulators in the color correcter are incorrectly adjusted and such adjustments can be corrected.

The precise value of the color correction can also be measured with the aid of the measuring mark and color correction can be removed in the corresponding regulator.

Although the invention has been described with respect to preferred embodiments, it is not to be so limited as changes and modifications may be made which are within the full intended scope of the invention as defined by the appended claims.

I claim as my invention:

1. Apparatus for detecting overcorrections in an electronic color correction system comprising comparators for each color channel each of which receives a color signal after color corrrection is accomplished, comparing said color signal with at least an upper threshold and comparing said color signal with at least a lower threshold and means for indicating when said color signal exceeds one or more of said thresholds.

2. Apparatus for detecting overcorrections in an electronic color correction system comprising a pair of comparators for each color channel each of which receive a color signal, one of said comparators comparing said color signal with an upper threshold and the other of said comparators comparing said color signal with a lower threshold and means for indicating when said color signal exceeds either or both of said thresholds, and in which electronic color corrrection is accomplished with a monitor with the aid of a level indicator for still pictures, including one mono-stable flip-flop connected at the output side of one of said pair of comparators, and a display lamp connected to said one mono-stable flip-flop and switched on when overcorrection occurs.

3. Apparatus according to claim 2 wherein the color correction is accomplished with a monitor for still picture, including a pair of AND gates (52,53) respectively connected to the outputs of each of said pair of comparators, an astable multivibrator (55) connected to said pair of AND-gates (52, 53), an OR-gate (54) receiving the outputs of said pair of AND-gates (52, 53) and its output cumulatively conveyed to the color input of said monitor.

4. Apparatus according to claim 2, in which the color correction is accomplished with a color monitor for still picture, including a pair of AND-gates (52, 53) respectively connected to the outputs of each of said pair of comparators, an on-off switch connected to said pair of AND-gates (52,53) and the outputs of said pair of AND-gates (52, 53) of all color channels connected to a multiple OR-gate (54), and its output cumulatively connected to the color input terminals of said monitor.

5. Apparatus according to claim 4 including a device for producing a measuring mark signal (31) for display of the value of the color signals additionally connected to the color inputs of said monitor.

6. Apparatus according to claim 4 wherein said on-off switch consists of an AND-gate (57) which receives one input from a two position switch (58) which has its other side connected to ground and said gate (57) is connected to a voltage source through an impedance, and an other input of said gate (57) is connected to an output of an OR-gate (56), a pulse generator connected to OR-gate (56) and the other input, of gate (56) connected to another switch (59) to ground or to a voltage source through a second resistor.

7. Apparatus for detecting overcorrections in an electronic color corrrection system comprising a pair of comparators for each color channel each of which receive a color signal, one of said comparators comparing said color signal with an upper threshold and the other of said comparators comparing said color signal with a lower threshold and means for indicating when said color signal exceeds either or both of said thresholds, and in which the electronic color correction is accomplished with a monitor with the aid of a level indicator of still pictures, including a pair of mono-stable flip-flops respectively connected to the outputs of said pair of comparators, said flip-flops having a switch-on time which is longer than the image repeat time of image of said monitor and a pair of display lamps connected to said pair of flip-flops, and switched on thereby to indicate above or below threshold conditions.

* * * * *